(12) United States Patent
Sinha et al.

(10) Patent No.: US 12,425,475 B2
(45) Date of Patent: Sep. 23, 2025

(54) SYSTEM AND METHOD TO DETERMINE BASELINE PERFORMANCE OF REMOTE ACCESS TO A CLOUD DESKTOP

(71) Applicant: Workspot, Inc., Campbell, CA (US)

(72) Inventors: Amitabh Bhuvangyan Sinha, San Jose, CA (US); Anushree Kunal Pole, Sunnyvale, CA (US); Virabrahma Prasad Krothapalli, San Jose, CA (US); David T. Sulcer, Pacifica, CA (US)

(73) Assignee: Workspot, Inc., Campbell, CA (US)

( * ) Notice: Subject to any disclaimer, the term of this patent is extended or adjusted under 35 U.S.C. 154(b) by 0 days.

(21) Appl. No.: 18/467,463

(22) Filed: Sep. 14, 2023

(65) Prior Publication Data

US 2024/0114068 A1    Apr. 4, 2024

Related U.S. Application Data

(60) Provisional application No. 63/375,812, filed on Sep. 15, 2022.

(51) Int. Cl.
*H04L 67/101*    (2022.01)
*H04L 43/08*    (2022.01)
*H04L 43/16*    (2022.01)

(52) U.S. Cl.
CPC ............ *H04L 67/101* (2013.01); *H04L 43/08* (2013.01); *H04L 43/16* (2013.01)

(58) Field of Classification Search
CPC ....... H04L 67/101; H04L 43/08; H04L 43/16; G06F 11/0712; G06F 11/0784; G06F 11/079; G06F 9/452
See application file for complete search history.

(56) References Cited

U.S. PATENT DOCUMENTS

| | | | |
|---|---|---|---|
| 10,691,547 B1 | 6/2020 | Moran et al. | |
| 11,669,349 B2 | 6/2023 | Sulcer et al. | |
| 11,693,682 B2 | 7/2023 | Sulcer et al. | |
| 12,056,509 B2 | 8/2024 | Sulcer et al. | |
| 2013/0324111 A1* | 12/2013 | Tontinuttanon | H04L 41/0686 455/424 |

(Continued)

FOREIGN PATENT DOCUMENTS

| | | | | |
|---|---|---|---|---|
| CA | 2891984 A1 | 8/2015 | | |
| CN | 110287078 A * | 9/2019 | ............ | G06F 11/302 |

(Continued)

*Primary Examiner* — Alina A Boutah
(74) *Attorney, Agent, or Firm* — NIXON PEABODY LLP

(57) ABSTRACT

A system and method for determining performance of connections between an endpoint device and a Cloud region is disclosed. A Cloud based host server communicates with the endpoint device operated by a user through a network. A data collection module is coupled to the Cloud server and the endpoint device. The data collection module periodically collects connection data associated with the endpoint device and collects context data of the endpoint device. An analysis engine compares a connection data metric derived from the connection data to a baseline value of the connection data metric associated with the context data of the endpoint device and determines substandard performance. The analysis engine provides an alert when a substandard performance is determined.

20 Claims, 9 Drawing Sheets

(56) References Cited

U.S. PATENT DOCUMENTS

| | | | |
|---|---|---|---|
| 2016/0378535 A1* | 12/2016 | Oh | G06F 9/4451 |
| | | | 718/1 |
| 2017/0013021 A1 | 1/2017 | Hoy et al. | |
| 2017/0186147 A1* | 6/2017 | He | H04L 67/535 |
| 2019/0370132 A1 | 12/2019 | Salapura et al. | |
| 2020/0067773 A1* | 2/2020 | Abes | H04L 41/14 |
| 2020/0089573 A1 | 3/2020 | Baggerman | |
| 2020/0089888 A1* | 3/2020 | Kelly | G06F 21/604 |
| 2021/0026661 A1* | 1/2021 | Sulcer | G06F 9/452 |
| 2021/0026679 A1* | 1/2021 | Sulcer | G06F 9/5077 |
| 2022/0179729 A1* | 6/2022 | Chan | G06F 11/0778 |
| 2022/0334903 A1* | 10/2022 | Pole | G06F 16/24558 |
| 2022/0385699 A1* | 12/2022 | Gupta | H04L 67/08 |
| 2023/0007839 A1* | 1/2023 | Karthikeyan | G06F 11/3495 |
| 2023/0266979 A1* | 8/2023 | Madishetti | G06F 9/4843 |
| | | | 718/1 |
| 2024/0004743 A1* | 1/2024 | Pole | G06F 9/452 |

FOREIGN PATENT DOCUMENTS

| | | | | |
|---|---|---|---|---|
| EP | 4113338 A1 * | 1/2023 | | G06F 17/18 |
| WO | WO-2011009000 A1 * | 1/2011 | | H04L 41/0631 |
| WO | WO-2019135773 A1 * | 7/2019 | | G06F 9/452 |

\* cited by examiner

EXAMPLES OF BASELINE PERIOD RAW MEASUREMENTS

| User | Geo Location | Other endpoint context | Cloud Region | Sample Time | Latency | Drops |
|---|---|---|---|---|---|---|
| ljones | San Francisco | Laptop / LAN / Fiber | CP US-West | 03/01/2022 4:03:00 pm | 3 ms | 0 |
| ljones | San Francisco | Laptop / LAN / Fiber | CP US-West | 03/01/2022 4:03:30 pm | 5 ms | 0 |
| ljones | San Francisco | Laptop / LAN / Fiber | CP US-West | 03/01/2022 4:04:00 pm | 3 ms | 0 |
| ljones | San Francisco | Laptop / LAN / Fiber | CP US-West | 03/01/2022 4:04:30 pm | 5 ms | 2 |
| ljones | San Francisco | Laptop / LAN / Fiber | CP US-West | 03/01/2022 4:05:00 pm | 3 ms | 3 |
| ljones | San Francisco | Laptop / LAN / Fiber | CP US-West | 03/01/2022 4:05:30 pm | 4 ms | 0 |
| ljones | Tahoe City | Tablet / Wi-Fi / 4G | CP US-West | 03/01/2022 4:06:00 pm | 22 ms | 4 |
| ljones | Tahoe City | Tablet / Wi-Fi / 4G | CP US-West | 03/01/2022 8:11:30 pm | 14 ms | 3 |
| ljones | Tahoe City | Tablet / Wi-Fi / 4G | CP US-West | 03/01/2022 8:11:30 pm | 11 ms | 7 |
| ljones | Tahoe City | Tablet / Wi-Fi / 4G | CP US-West | 03/01/2022 8:11:30 pm | 25 ms | 2 |
| ljones | Tahoe City | Tablet / Wi-Fi / 4G | CP US-West | 03/01/2022 8:11:30 pm | 15 ms | 4 |
| ljones | Tahoe City | Tablet / Wi-Fi / 4G | CP US-West | 03/01/2022 8:11:30 pm | 28 ms | 2 |

FIG. 6

EXAMPLE OF ADDITIONAL SESSION INFORMATION FROM AGENT

| User | Sample Time | Region | Application List |
|---|---|---|---|
| ljones | 03/01/2022 4:03:30 pm | CP US-West | CAD, Collab |
| ljones | 03/01/2022 8:11:30 pm | CP US-West | CAD, Collab, Multi-player game |

FIG. 7

RECENT VS BASELINE PERFORMANCE EXAMPLE FOR ONE USER

| User | Geo Location | Other endpoint context | Public Cloud Region | Baseline Avg Latency | Recent Avg Latency | % Change | Baseline Avg Drop Rate | Recent Avg Drop Rate | % Change | Recent Apps |
|---|---|---|---|---|---|---|---|---|---|---|
| ljones | San Francisco | Laptop / LAN / Fiber | CP US-West | 3.8 ms | 3.1 ms | -18% | 1.7 / m | 1.8 / m | +6% | CAD, Collab |
| ljones | Tahoe City | Tablet / Wi-Fi / 4G | CP US-West | 19.2 ms | 63.2 ms | +229% | 7.3 / m | 24.3 / m | +233% | CAD, Collab, Multi-player game |

FIG. 8A

EXAMPLE DEGRADED EXPERIENCE ALERT INTERFACE

User Alerts

| User | Severity | Alert | Alert Detail | Connection Detail | Troubleshooting |
|---|---|---|---|---|---|
| ⚠ Bob Smith | Moderate | High Latency | +13% | San Francisco -> CP US-West over WAN | Log Information |
| ⚠ Lauren Smith | Critical | High Latency | +229% | Tahoe City -> CP US-West over 4G | Log Information |
| ⚠ Xavier Cougat | Moderate | Packet Drops | +40% | San Francisco -> CP US-West over LAN | Log Information |

FIG. 8B

RECENT VS BASELINE PERFORMANCE EXAMPLE FOR ALL ENDPOINT CONTEXT - CLOUD REGION PAIRS

| Geo Location | Other endpoint context | Public Cloud Region | Baseline Avg Latency | Recent Avg Latency | % Change | Baseline Avg Drop Rate | Recent Avg Drop Rate | % Change |
|---|---|---|---|---|---|---|---|---|
| San Francisco | Laptop / LAN / Fiber | CP US-West | 4.1 ms | 4.0 ms | -2% | 1.7 / m | 1.4 / m | -18% |
| Tahoe City | Tablet / Wi-Fi / 4G | CP US-West | 18.2 ms | 19.3 ms | +6% | 7.0 / m | 7.0 / m | 0% |

FIG. 9

SYSTEM AND METHOD TO DETERMINE BASELINE PERFORMANCE OF REMOTE ACCESS TO A CLOUD DESKTOP

PRIORITY CLAIM

The present disclosure claims the benefit of and priority to U.S. Provisional Application Ser. No. 63/375,812 filed Sep. 15, 2022. The contents of that application are incorporated by reference in their entirety.

TECHNICAL FIELD

The present disclosure relates generally to network-based virtual desktop systems. More particularly, aspects of this disclosure relate to a system that provide performance evaluation of remote access context of an endpoint device to a Cloud region.

BACKGROUND

Computing systems that rely on applications operated by numerous networked computers are ubiquitous. Information technology (IT) service providers thus must effectively manage and maintain very large-scale infrastructures. An example enterprise environment may have many thousands of devices and hundreds of installed software applications to support. The typical enterprise also uses many different types of central data processors, networking devices, operating systems, storage services, data backup solutions, cloud services, and other resources. These resources are often provided by means of cloud computing, which is the on-demand availability of computer system resources, such as data storage and computing power, over the public internet or other networks without direct active management by the user.

Users of networked computers such as in a cloud-based system may typically log into an endpoint device such as a computer workstation or mobile device and are provided a desktop application that displays an interface of applications and data available via the network or cloud. Such desktop applications will be initially accessed when a user logs in, but may remain active to respond to user operation of applications displayed on the desktop interface. Users may activate the desktop application on any computer connected to the network.

Cloud-based remote desktop virtualization solutions or remote application virtualization have been available for over a decade. A cloud region is a particular public or private data center that is provided by a public or private cloud provider. In cloud-based remote desktop virtualization offerings, there is typically a capability of associating a remote desktop virtualization template in a particular cloud region with a remote desktop virtualization pool in the same cloud region as part of the general configuration model. This remote desktop virtualization template is customized with the image of the right desktop or application for a particular remote desktop or application virtualization use case.

A global, multi-cloud virtual desktop system allows a user to connect to a cloud desktop, which may be a remote desktop used by a single user, or a remote application server usable by multiple users, existing in public or private cloud infrastructure, from an endpoint device that may be a laptop computer, tablet, smartphone, or other such network capable device. The endpoint device context is typically thought of as simply a "location", but actually includes a geographic location, a device type and operating system, software versions, one or more intermediate networks of different quality, and possibly other attributes.

The user experience—measured as response latency, packet drops, and possibly other metrics—will vary depending on the pairing of an endpoint device context with the public cloud region the endpoint device is connecting to. A desktop service control plane continuously gathers latency and packet drop information for each user, from both sides of every remote desktop protocol connection: the endpoint context, as well as the destination public cloud region. However, the user experience varying from session to session, device to device, or location to location creates a source of discontent for users. Once end users report poor performance, they are already unhappy. Worse, it can be difficult to identify the cause of the problem.

Thus, there is a need for a system that may collect data on endpoint device context to determine the cause of faulty performance. There is a further need for a system that may determine a baseline performance for comparison of the context of an endpoint device.

SUMMARY

One disclosed example is a Cloud system that includes a Cloud based host server that communicates with an endpoint device operated by a user through a network. A data collection module is coupled to the Cloud based host server and the endpoint device. The data collection module is operable to periodically collect connection data associated with the endpoint device and collect context data of the endpoint device. An analysis engine is operable to compare a connection data metric derived from the connection data to a baseline value of the connection data metric. The baseline value of the connection data metric is associated with the context data of the endpoint device. The analysis engine determines substandard performance based on the comparison. The analysis engine provides an alert when a substandard performance is determined.

In another implementation of the disclosed example system, the Cloud based host server provides access to a Cloud desktop to a user of the endpoint device. In another implementation, the data collection module is operable to collect a list of applications running on the Cloud desktop or the endpoint device. In another implementation, the user is one of a plurality of users that access the Cloud based host server via a plurality of endpoint devices. In another implementation, the data collection module determines the baseline value based on users having a similar context for the plurality of users of the endpoint devices. In another implementation, the connection data is one of packet drop count or network latency time. In another implementation, the contextual data includes one of endpoint device location, network connection type, connection hardware, and endpoint device type. In another implementation, the analysis engine provides a percentage of a connection data metric relative to an average data metric of the baseline. In another implementation, the example system includes a desktop service control plane interfacing with a client application on the endpoint device for collecting the context data and an agent on the Cloud based host server for collecting the connection data. In another implementation, the desktop service control plane is configured to upscale infrastructure of the Cloud region, remove unsanctioned applications, or prioritize selected traffic to the Cloud region in response to determining substandard performance.

Another disclosed example is a method for evaluation of performance of an endpoint device in network communication to a Cloud region. Contextual data is collected from the endpoint device. Periodic connection data relating to communication between the endpoint device and the Cloud region is collected. A connection data metric from the collected periodic connection data is compared with a baseline connection data value associated with the context data from endpoint device. It is determined whether performance of the connection is substandard based on the comparison.

In another implementation of the disclosed example method, access to a Cloud desktop to a user of the endpoint device is provided by the Cloud region. In another implementation, the example method includes collecting a list of applications running on the Cloud desktop or the endpoint device. In another implementation, a user associated with the endpoint device is one of a plurality of users that access the Cloud region via a plurality of endpoint devices. In another implementation, the baseline value is determined based on users having a similar context for the plurality of users of the endpoint devices. In another implementation, the connection data is one of packet drop count or network latency time. In another implementation, the contextual data includes one of endpoint device location, network connection type, connection hardware, and endpoint device type. In another implementation, the example method includes providing a percentage of a connection data metric relative to an average data metric of the baseline. In another implementation, the example method includes configuring a desktop service control plane to upscale infrastructure of the Cloud region, remove unsanctioned applications, or prioritize selected traffic to the Cloud region in response to determining substandard performance.

Another disclosed example is a non-transitory computer-readable medium having machine-readable instructions stored thereon, which when executed by a processor, cause the processor to collect contextual data from an endpoint device and collect periodic connection data relating to communication between an endpoint device and a Cloud region. The instructions cause the processor to compare a connection data metric from the collected periodic connection data with a baseline connection data value associated with the context data from endpoint device. The instructions cause the processor to determine whether performance of the connection is substandard based on the comparison.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which:

FIG. 6 is a table showing raw performance data from different users;

FIG. 7 is a table that shows enhanced information such as the applications running on endpoint devices accessing the regional Cloud in FIG. 2;

FIG. 8A is a table that may be displayed to show recent versus baseline performance of endpoint device contexts for a user;

FIG. 8B is a table that may be displayed to alert an administrator of performance issues for different endpoint devices;

FIG. 9 is a table showing recent versus baseline performance of different endpoint contexts by geographic locations;

Figure 1:
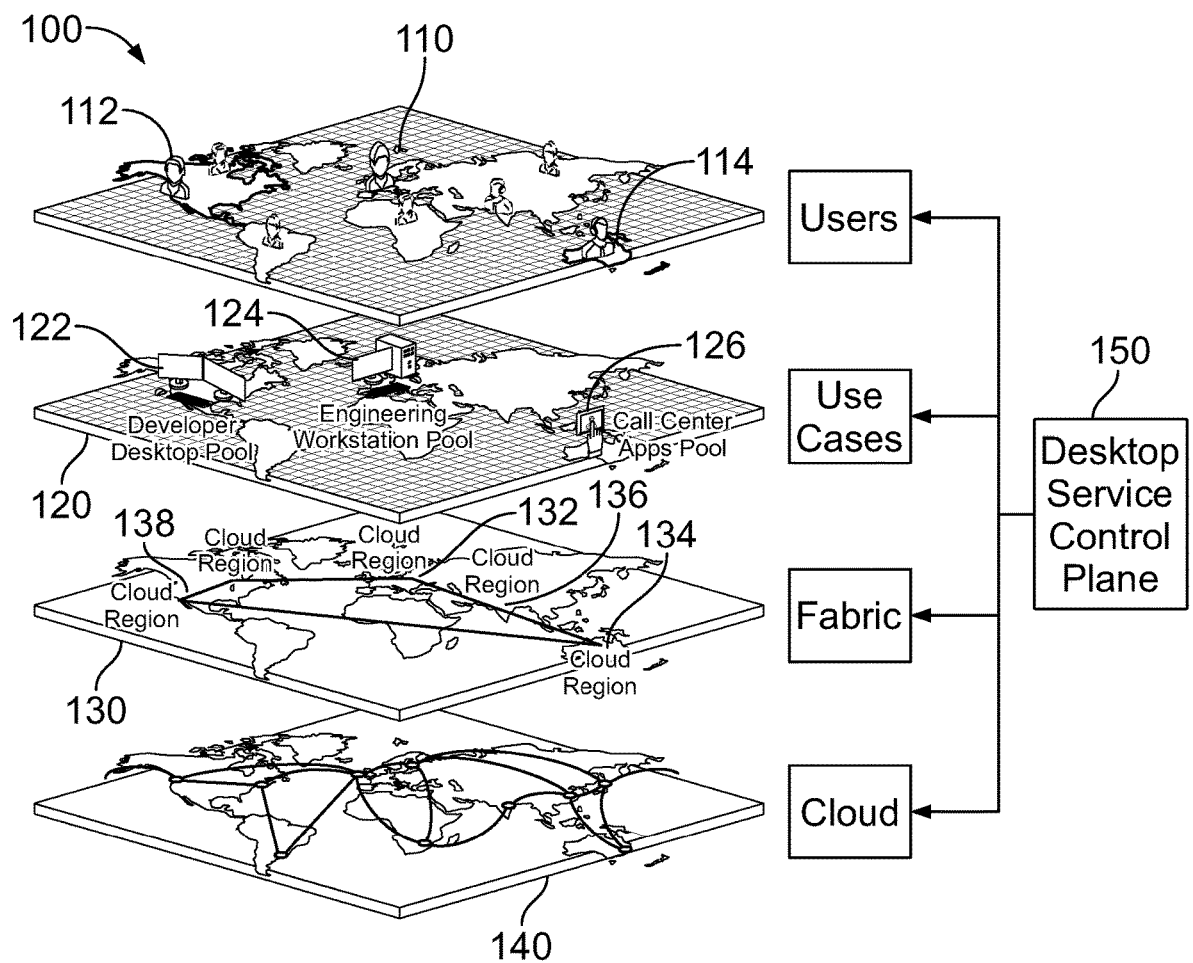
FIG. 1 is a high-level block diagram illustrating an example Cloud based system allowing access to virtual desktops from different cloud providers.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure relates to a method and system to produce performance baseline metrics for each user from their endpoint device context, in order to detect degradation of performance over time, and automatically perform relevant restorative actions. Furthermore, because a user may use multiple endpoint device contexts at different times, and possibly different cloud regions, it also allows comparison of different pairings of endpoint device contexts with specific public cloud regions to understand the performance implications of those choices.

FIG. 1 shows a high level block diagram of a cloud desktop service system 100. The cloud desktop service system 100 may also be referenced as a global desktop system because it provides virtual desktops for users globally. Alternatively, the cloud desktop service system 100 may provide cloud based applications to users. The cloud desktop service system 100 includes four layers, a users layer 110, a use cases layer 120, a fabric layer 130, and a Cloud layer 140. A Cloud desktop references as a remote desktop used by a single user, or a remote application server usable by multiple users.

The users layer 110 represents desktop users having the same computing needs, that may be located anywhere in the world. In this example, the users layer 110 includes users 112 and 114, who are in geographically remote locations and access desktops via computing devices.

The use cases layer 120 represents common global pools of Cloud desktops available to serve the users, whereby each global pool is based on a common desktop template. There can be multiple global pools based on which groups users belong to and their job requirements. In this example, the pool for the users 112 and 114 may be one of a developer desktop pool 122, an engineering workstation pool 124, or a call center application pool 126. The desktops each include configuration and definitions of resources necessary to offer the Cloud desktop. The use cases layer 120 represents common logical pools of desktops available to serve the users, whereby each logical pool may be based on common desktop requirements. There can be multiple logical pools based on which groups users belong to and their job requirements. In this example, the pool for the users 112 and 114 may be one of a developer desktop pool 122, an engineering workstation pool 124, or a call center application pool 126. The cloud desktops each include configuration and definitions of resources necessary to offer the cloud desktop. The desktops in a particular pool may each be supported by different cloud regions based on the requirement of the desktop pool.

For example, pools such as the developer desktop pool 122 or the engineering workstation pool 124 allow users in the pool a cloud desktop that allows access to graphic processing unit (GPU) based applications. Other example applications may include those applications used for the business of the enterprise, for example, ERP (enterprise resource planning) applications or CRM (customer relationship management) applications. These applications allow users to control the inventory of the business, sales, workflow, shipping, payment, product planning, cost analysis, interactions with customers, and so on. Applications associated with an enterprise may include productivity applications, for example, word processing applications, search applications, document viewers, and collaboration applications. Applications associated with an enterprise may also include applications that allow communication between people, for example, email, messaging, web meetings, and so on.

The fabric layer 130 includes definitions and configurations for infrastructure and desktop service resources, including gateways, desktop templates, and others that are applied to cloud regions. The resources are maintained as cloud regions such as Cloud regions 132, 134, 136, and 138. The cloud regions can be added or removed as needed.

The Cloud layer 140 implements the resources defined by the use case layer 120 and fabric layer 130, including virtual cloud desktops, infrastructure, and other virtual resources, all of which are virtual machines or other virtual resources hosted in a public cloud.

The layers 110, 120, 130, and 140 are created and orchestrated by a desktop service control plane 150 that can touch all the layers. The desktop service control plane 150 is a key component to orchestrate a cloud desktop service system such as the cloud desktop service system 100 in FIG. 3. The desktop service control plane 150 can manage the entire lifecycle of a Cloud desktop service implementation, from creating and managing the required Cloud desktops, to monitoring and analyzing the stream of operational data collected, enforcing security policies, and optimizing the experience for IT administrators and cloud desktop users. For example, the desktop service control plane 150 may register a set of a virtual networks, virtual storage resources, and more. Within a virtual network, the control plane 150 may further register and coordinate the use of gateways, enterprise connectors, desktop templates, connection brokers, and more.

The two desktop users 112 and 114 in different parts of the world who are each able to access an example high-performance Cloud desktop service from the Cloud desktop service system 100. Users, such as users 112 and 114, each may use a client endpoint device to access the cloud desktop service. Client endpoint devices may be any device having computing and network functionality, such as a laptop computer, desktop computer, smartphone, or tablet. Client endpoint devices execute a desktop client to access remote applications such as the desktop. The client application authenticates user access to the applications. A client endpoint device can be a conventional computer system executing, for example, a Microsoft™ Windows™-compatible operating system (OS), Apple™ OS X, and/or a Linux distribution. A client endpoint device can also be a client device having computer functionality, such as a personal digital assistant (PDA), mobile telephone, tablet, video game system, etc. In this example, the client application displays an icon of the desktop or desktops available to the user. As will be explained, the cloud desktop is made available to the user through the client application on the user endpoint device. The users may use the same or different endpoint devices at different geographical locations to access the cloud desktop. As will be explained the user experience may differ based on factors such as the type of device and the location of the access to the Cloud desktop service system 100.

Figure 2:
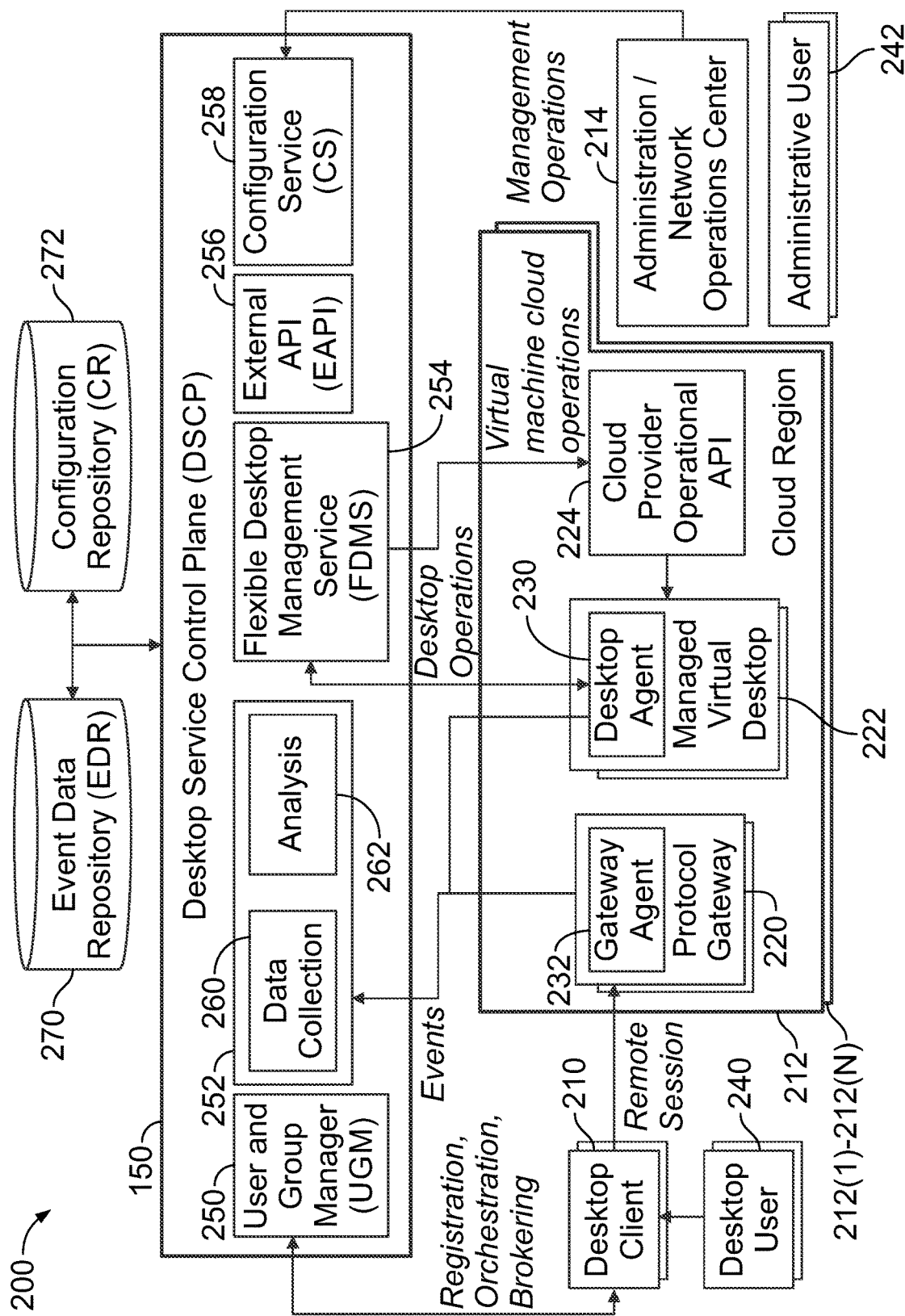
FIG. 2 is a block diagram of a Cloud region and desktop service control plane of the example Cloud desktop fabric in FIG. 1.

FIG. 2 is a block diagram of some examples of components of the Cloud desktop service system 100, including an example set of desktop clients 210, a Cloud region 212, and an administration center 214, that interact with and can be orchestrated by the desktop service control plane 150. The desktop client 210 communicates with the desktop service control plane 150 in order to be registered with the fabric, assigned a desktop, remotely configured, and for other purposes. One other purpose is to monitor latency, response-time, and possibly other data and events that measure quality of user experience. Another purpose is to report user interaction events. There may be multiple Cloud regions (e.g., cloud regions 212(1) to 212(N)) similar to the Cloud region 212, but only one Cloud region 212 is shown in detail for simplicity of explanation. The Cloud region 212 may include a set of protocol gateways 220, a set of managed virtual desktops 222, and a cloud service provider operational API 224. These components all communicate with the desktop service control plane 150. The Cloud region 212 may be one of the Cloud regions 132, 134, 136, and 138 in FIG. 1.

Such Cloud regions include a cluster of Cloud based host servers that host the various applications as well as appropriate storage capabilities, such as virtual disks, memory, and network devices. Thus, the Cloud region 212 typically comprises IT infrastructure that is managed by IT personnel. The IT infrastructure may include servers, network infrastructure, memory devices, software including operating systems, and so on. If there is an issue related to an application reported by a user, the IT personnel can check the health of the infrastructure used by the application. A Cloud region may include a firewall to control access to the applications hosted by the Cloud region. The firewall enables computing devices behind the firewall to access the applications hosted by the Cloud region, but prevents computing devices outside the firewall from directly accessing the applications. The firewall may allow devices outside the firewall to access the applications within the firewall using a virtual private network (VPN).

The protocol gateway 220 may be present to provide secure public or internal limited access to the managed Cloud desktops, that may be deployed on a virtual machine of its own. A gateway agent 232 is software that is deployed on that gateway virtual machine by the desktop service control plane 150, and serves to monitor the activity on the gateway 220, and enable the desktop service control plane 150 to assist in configuration and operations management of the gateway 220.

The example desktop client 210 is software and device hardware available in the local environment of a desktop user endpoint device 240 to remotely access a managed Cloud desktop using a remote desktop protocol. The desktop client 210 runs on the endpoint device 240 and communicates with the desktop service control plane 150 to monitor latency, response-time, and other metrics to measure quality of user experience and also supports a remote display protocol in order for users to connect to a desktop application run by the Cloud region 212. As will be explained the endpoint device 240 represents any device that may be employed by a user to access the cloud region 212. Thus, a user may access the cloud region 212 with different endpoint devices at different times and locations.

The managed cloud desktop 222 is itself provisioned and maintained by the desktop service control plane 150. A desktop template may be used to manage pools of such managed Cloud desktops. The desktop template is used to instantiate cloud desktops with the correct virtual machine image and a standard set of applications for a particular use case. A desktop agent such as desktop agent 230 is software that is deployed on that managed cloud desktop by the desktop service control plane 150, and serves to monitor the activity on the managed cloud desktop, and enable the desktop service control plane 150 to assist in configuration and operations management of the managed Cloud desktop.

The cloud service provider operational application programming interface (API) 224 presents services provided by the cloud service provider that also participate in the management of the virtual machine. This can be utilized by a desktop service control plane 150 to perform operations like provisioning or de-provisioning the virtual machine. The API may also include APIs to retrieve telemetry data collected by cloud service provider. The desktop service control plane 150 includes a data collection engine and an analysis engine as part of a monitoring service. The monitoring service collects context data for endpoint devices and determines quality of service as will be explained herein. The control plane 150 may also include automated responses to improve connections based on the collected data.

Administrative users 242 can interact with operations reporting interface software at the administration center 214 that allows management and administration of the desktop service control plane 150.

Other components and services may interact with the desktop service control plane 150 but are omitted from FIG. 2 for simplicity, such as enterprise connectors, network monitoring services, customer relationship management (CRM) systems, and many others.

The desktop service control plane 150 itself can perform many internal centralized functions also not depicted in in FIG. 2, including pool management, user and group management, cloud service adapters, virtual desktop templates, data analysis, high-availability management, mapping users to the optimal cloud region, security policy management, monitoring, compliance, reporting, and others.

The control plane 150 includes a user and group manager 250, a monitoring service 252, a desktop management service (DMS) 254, an external API (EAPI) 256, and a configuration service (CS) 258. As will be explained, the monitoring service 252 includes a data collection module 260 and an analysis engine 262 to monitor different endpoint contexts that access the cloud regions. The control plane 150 may access an event data repository 270 and a configuration repository 272. Although only one cloud region 212 is shown in detail, it is to be understood that the control plane 150 may facilitate numerous cloud regions.

The monitoring service 252 makes both routine and error events available to administrators and can analyze operational performance and reliability. The monitoring service 252 interacts with components including the desktop client 210, desktop agent 230, gateway agent 232 to obtain operational data relating to the desktop, and operational data generated by the control plane 150 itself. The monitoring service 252 stores all such operational data for later analysis. As will be explained desktop clients may report information about the location of the user to the collection module 260. Desktop agents can report information about the duration of each connection, and other performance information, including the applications used by the desktop to the collection module 260. Gateway agents can also report performance information to the collection module 260 because the gateway agent sits between the desktop client and the desktop on the network. The analysis module 262 compares collected performance information with contextual baseline data from the endpoint devices to provide alerts of anomalies. Furthermore, the system may collect individual end user feedback and process it into usability metrics. As an example, the endpoint software may ask for a star rating that indicates perceived performance, and these may be compiled into a satisfaction rating over time by the monitoring service 252.

The desktop management service 254 interacts with the one or more managed virtual machines (MVMs) 222 in the cloud region 212 and other regional cloud regions 212(1) to 212(N). In this example, the desktop management service 254 manages resources for providing instantiated Cloud desktops to the users in the logical pools, orchestrating the lifecycle of a logical desktop.

The administration center 214 works directly with the desktop service control plane 150 as its primary human interface. The administration center 214 allows the administrative user 242 to configure the functions of the control plane 150 through the configuration service 258. The configuration service 258 supports editing and persistence of definitions about the desktop service, including subscription information and policies. The administration center 214 may be where the desktop requirement dimensions are configured by the administrative user 242. The system 100 in FIG. 2 allows the collection of endpoint device context data and connection performance data for the purpose of evaluation of performance in accordance with the process described herein.

Figure 3:
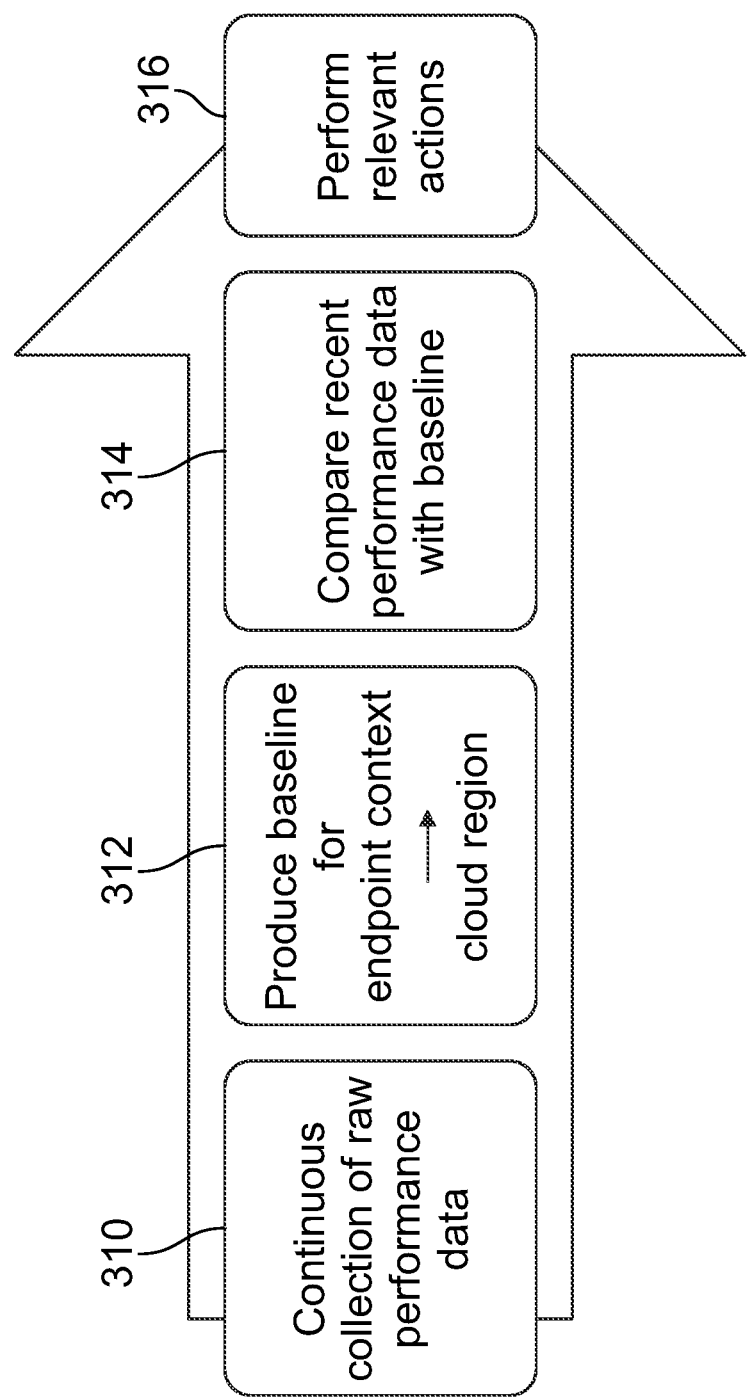
FIG. 3 is a flow diagram of a routine to collect data for performance evaluation of endpoint device connection to the Cloud region.

FIG. 3 shows the process of executed by the data collection and analysis modules 260 and 262 of the monitoring service 252 of the desktop service control plane 150 in FIG. 2 to make evaluations based on baseline performance of remote access to the Cloud system. The system first performs continuous collection of raw performance data (310). The system produces a baseline for endpoint device context in the Cloud region (312). The system compares the recent performance data with the baseline for endpoint device context (314). The system then performs relevant actions if necessary based on the comparison (316).

The continuous collection of raw performance data for a user is performed by the data collection module 260 of the monitoring service 252 in the desktop service control plane 150 in FIG. 2. The monitoring service 252 is in communication with the desktop client application for endpoint device context data and the desktop agent 230 and gateway agent 232 for performance data. Example of raw performance data types include network latency, bandwidth, packet drop counts, and end user satisfaction ratings. The baseline model is produced for each pair of endpoint device context and public cloud region for a user that requests a Cloud desktop.

The comparison may be output in the form of visualizations or other reports showing both a baseline of expected performance and actual recent performance for the user with regard to a specific endpoint context and cloud region combination. The reports can include a report of all users experiencing degraded performance. Optionally, the reports may include additional relevant diagnostic information that may assist an administrator to address the degraded performance for users.

The appropriate actions to address degraded performance that may be performed by the modules in the Cloud region, either automatically or under direction of an administrator, could include triggering the fetch of additional detailed telemetry data, terminating rogue or disallowed processes, automatically scheduling a reboot of the endpoint and/or cloud desktop, triggering a notification to an administrator to work with the user to reboot the endpoint and/or cloud desktop, determining or scheduling an upgrade to the endpoint device or endpoint device software or cloud desktop, triggering a patch rollout, triggering malware recovery, or other appropriate actions determined by the IT staff.

Figure 4:
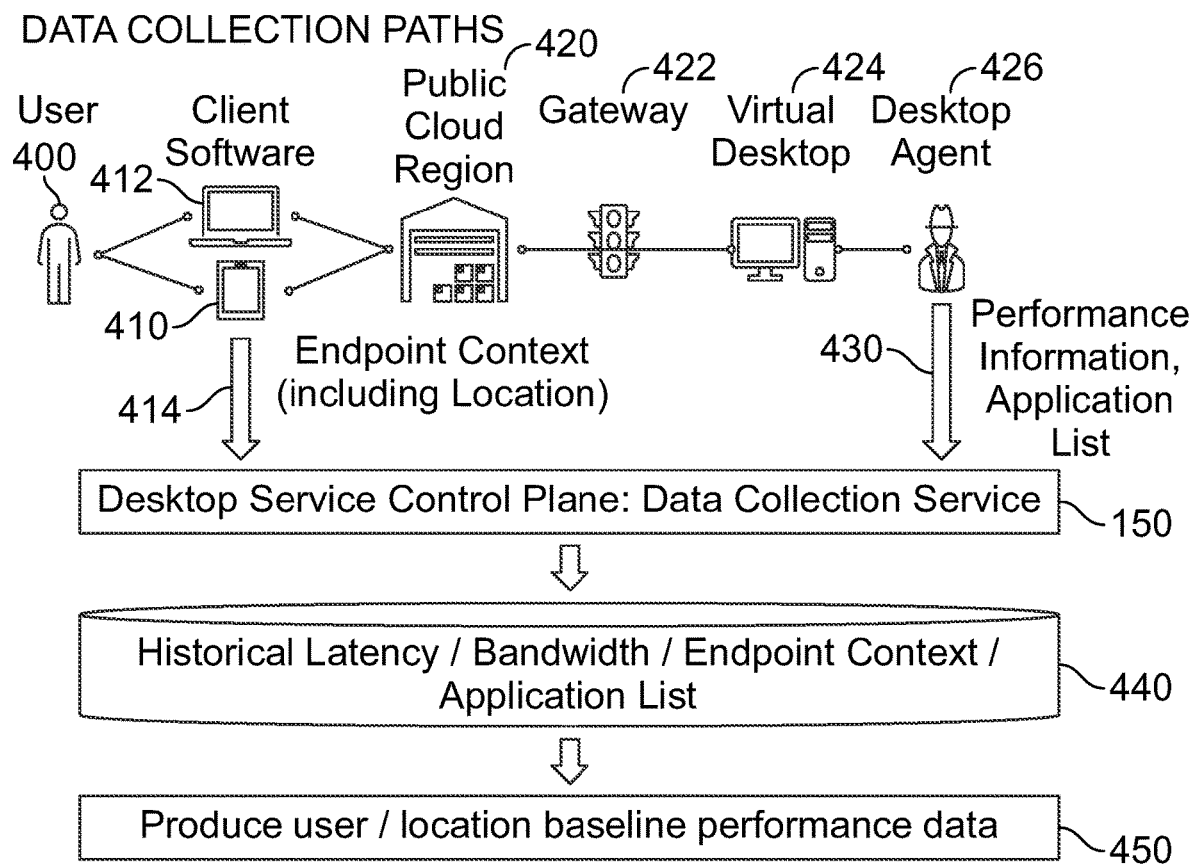
FIG. 4 is a diagram of data collection paths and the data collection process for the example system.

FIG. 4 is an example diagram of potential raw data collection paths for the system 100 that allows a user 400 to access a virtual or Cloud based desktop. The raw data can be collected from the collection paths shown in FIG. 4 by the modules of the desktop service control plane 150 and the baseline may be determined from the raw data as outlined above in FIG. 3. The user 400 operates an endpoint device 410 that executes client software 412. The endpoint device 410 provides endpoint context data 414. The endpoint device 410 is associated with a public cloud region 420 such as the cloud regions 212 in FIG. 2. The public cloud region 420 interacts through a gateway 422 that provides access to a virtual/Cloud desktop 424 that may execute a desktop agent 426.

The end user 400 can access the same Cloud desktop 424 at different times from different endpoint devices with different contexts such as the endpoint context 414 provided by the endpoint device 410. In this example the endpoint context data includes the location of the end user 400, type of device, connection type, and network type. Extended information could include application performance snapshots, malware reports, endpoint system logs, or other diagnostic information generated by the endpoint device. The client software 412 forwards endpoint context data 414 to the data collection service 260 of the desktop service control plane 150.

The client software 412 creates a remote desktop protocol connection using a virtual network existing in the public cloud region 420. The connection itself is established with the cloud desktop 424 (typically via a protocol gateway such as the gateway 422). The agent software 426 running on the virtual desktop 424 collects performance data 430 related to the user session and forwards the performance data latency, number of drops, bandwidth, CPU utilization data, and memory utilization data to the data collection module 260 of the desktop service control plane 150. The agent software 426 also collects an application list for the virtual desktop 424. The desktop client 210 also collects an endpoint device application list. The endpoint application list is a list of the applications running on the endpoint device when the desktop client 210 in FIG. 2 is running.

In this example, the data collection module 260 of the desktop service control plane 150 aggregates the data from the endpoint context data 414, the performance information 430, and the application list to produce an aggregated data set 440. The aggregated data set 440 is used by the desktop service control plane 150 to produce baseline performance data. The aggregated data set 440 may also be used to produce other reports related to the user or users and the cloud region. The desktop service control plane 150 may then perform relevant restorative actions based on the performance data.

Figure 5:
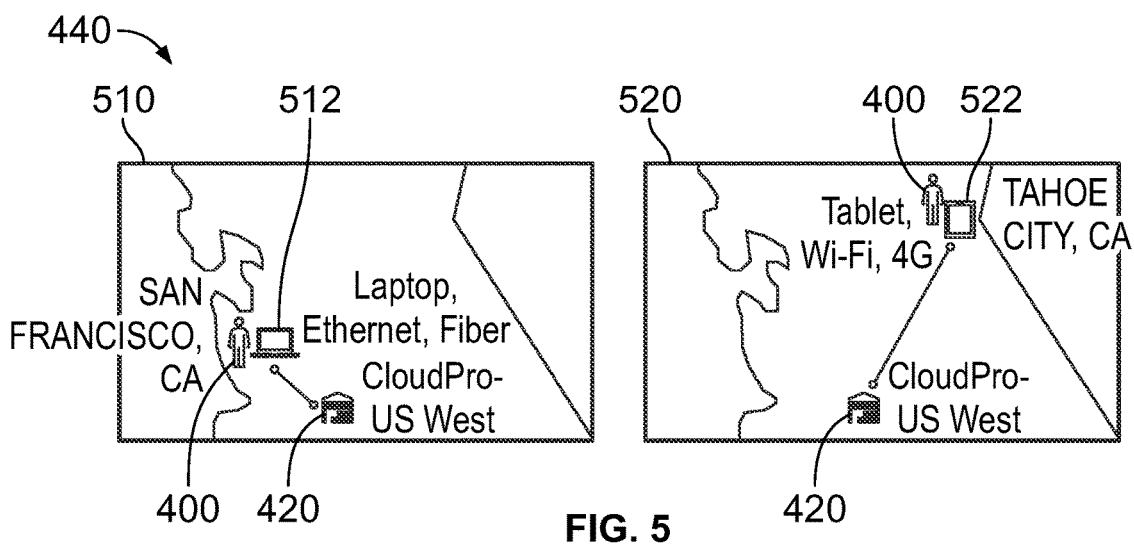
FIG. 5 shows two scenarios where a user is at two different locations using different endpoint devices.

FIG. 5 shows a scenario where the same user 400 may connect to the same virtual desktop at different times from different locations using different endpoint devices. A map 510 shows the user connecting to the Cloud region 420 using a first device 512 in a first geographic area. A map 520 shows the same user connecting to the Cloud region 420 using a second different device 522 in a second geographic area. Thus FIG. 5 portrays two endpoint contexts. Of course there may be additional endpoint contexts for different geographic areas and different endpoint devices.

In this example, one endpoint context is associated with the first device 512, which is a high-performance laptop over a high-speed network in one geographic location. A second endpoint context is associated with the second user device 522, which is a mobile device connecting over a slower cellular network in another geographic location. As explained above, the example process collects context data from both scenarios to determine baseline performance of the particular context.

FIG. 6 is an example table 600 of some types of raw performance data that may be collected from different users with different endpoint context data reflecting the corresponding endpoint device during a baseline period. In this example the baseline period is fixed as 3-minute periods during the previous day, with a sample taken every 30 seconds. The table 600 includes a user column 610 listing a user, a geographic location column 612 listing the location of the user, and an other endpoint context column 614 listing highlighted data such as the type of endpoint device, the connection type, and the connection hardware. In this example, only key highlights of context data are shown, but all other context data, such as list of applications running on the endpoint device, could be provided for further analysis. The table 600 also includes a Cloud region column 616 that lists the Cloud region providing connection to the endpoint device, a sample time column 618 that lists when the data was collected, a latency column 620 that lists the latency time of the endpoint context, and a drops column 622 that indicates the recent frequency of packet drops in the connection. The baseline packet drop rate is the average of the number of packet drops per minute over the baseline sample period. The number of packet drops is an indicator of poor network quality.

In this example there is baseline data from the two different endpoint contexts as shown in FIG. 5. The first context is where the user 400 is geographically located in San Francisco and the second context is where the user 400 is in Tahoe City. In this example, the geo location and other endpoint context data are forwarded by the client software executed by the endpoint device.

The endpoint context information collected about the network connection may include only local network information, or, if available, information about the quality of other parts of the connection such as Fiber Optic or 4G. Extended information may need to be collected using extended information gathering. The extended information may include quality of service metrics that may be collected from sources such as network or internet service providers.

Other related information is also forwarded by the desktop agent 426 in FIG. 4. FIG. 7 shows a table 700 that includes a user column 710 listing the user, a sample time column 712 listing the sample time, a Cloud region column 714 listing the Cloud region, and an application list column 716. The application list column 716 lists the applications running based on data collected from the desktop agent 426 during each sample time. Thus, the first listing lists a CAD application, and a collaboration application, while the second listing lists the CAD application, the collaboration application, and a game application.

The desktop service control plane 150 will perform an analytical transformation of the data such as the contextual data and connection data to produce aggregated baseline data. In this example, the analytical data is produced as two connection data metrics for the combination of user, location, device, and network. FIG. 8A shows a table 800 that compares recent performance of an endpoint device with the baseline data collected as explained above. The table 800 is an example of a report that may displayed to an administrator for information and action purposes. The table 800 has a user column 810, a geographic location column 812 that lists the geographic location, an endpoint context column 814 that lists data relating to the endpoint device context, a Cloud region column 816, a baseline average latency column 818, a recent average latency column 820, a percentage change column 822, a baseline average drop rate column 824, a recent average drop rate column 826, a percentage change column 828, and a recent applications column 830.

The desktop service control plane 150 also continuously monitors recent raw performance data as well, and performs a similar computation of the recent metrics, such as network latency and drop rate. The table 800 that shows an example of four recent metrics for a user that has accessed different endpoint contexts and Cloud regions. Thus, the table 800 may show the percentage change between the recent average latency and the baseline latency for each context. The baseline network latency is the average of latency readings over the baseline sample period. The recent network latency is the latency reading over some predetermined time interval, such as the last hour. In this example, the second entry shows a large percentage change between recent average latency and the baseline average latency. The entry under the recent average latency column 820 and percentage column 822 may be emphasized such as display in a different color to better notify an administrator of a potential fault.

The table 800 may also show the percentage change between recent drop rate and baseline drop rate. In this example, the second entry shows a large percentage change between recent drops and the baseline average drops. The entry under the recent average drop rate column 826 and percentage column 828 may be emphasized such as being displayed in a different color if the table 800 is displayed to better notify an administrator of a potential fault.

As shown in FIG. 8A, the difference between the baseline and recent metrics can be further analyzed based on configuration rules to call attention to, or otherwise generate an alarm or alert to an administrator, to indicate that there is a significant degradation of recent performance compared to the baseline. The alert may take place as a visual indicator on a display or an audio indicator, or in the form of a communication such as text or email, or a graphical or audible alert in a network operations center.

In the example in FIG. 8A, the additional information collected from the agent software 426 in FIG. 2 may be used to further call attention to the additional application described as "Multi-player game" running from the Tahoe City location that may assist in troubleshooting the problem by suggesting a possible root cause of the degradation.

FIG. 8B shows a table 850 that may be displayed to an administrator to show each user experiencing problems in the connection between the endpoint device and the Cloud region. The table 850 includes a user column 860, a severity column 862, an alert column 864, an alert detail column 866, a connection detail column 868, and a trouble shooting column 870. The data in the table 850 may be generated by the analysis module 262 for each current user experiencing connection issues. The severity column 862 rates the severity of the issue encountered. The severity may be classified by a scale such as from Warning to Moderate to Critical, based on pre-configured ranges of variations between baseline and current metrics. The user name in the user column 860 may be assigned a respective icon to indicate the severity. The alert column 864 lists the metric that is identified as deviating from the baseline such as high latency or high number of drops. The alert detail column 866 displays the percentage difference between the baseline value for the context of the endpoint device and the current metric. The connection detail 868 shows the connection context to the endpoint device. The trouble shooting column 870 provides links to a detailed log of recent events, detailed information about the cloud desktop, gateway, user profile, or any other relevant diagnostic information.

The desktop service control plane 150 may be configured to automatically execute certain actions to restore expected performance. These restorative actions can be in many forms. For example, a workflow may be triggered by the control plane 150 to identify the use of blacklisted applications, and conditionally restore a desktop image of the user to an approved template, thereby removing unsanctioned applications that may be creating the performance problem. Another example of a restorative action may be upscaling required infrastructure, such as remote desktop protocol gateway services to address the identified fault. For example, the size of the gateway cluster servicing traffic from the endpoint may be automatically increased. Another example of a restorative action may be to apply QoS (quality of service) throttling for users of non-essential applications, such as video applications, to preserve the user experience of other users. Alternatively, the control plane 150 may prioritize latency-sensitive traffic (such as tele-conferencing applications). For example, bandwidth used for collaborative software such as that used to host virtual meetings may have priority over bandwidth used for some batch processing applications. Another example of a restorative action may be to migrate the user's desktop to an alternative Cloud region.

Furthermore, the data may be aggregated across users that are using the same combination of endpoint context and public cloud region for both baseline and recent metric collection. For example, there may be offices located in San Francisco and Tahoe City who share the networks associated with those locations. In this case, the aggregated metrics about recent versus baseline may show a pattern of user experience with implications to the performance expected by each single user. This also can help determine if a problem is isolated to one user.

FIG. 9 shows a table 900 that shows an example of aggregated metrics that may be displayed to an administrator. The table 900 has a geographic location column 910 that lists the geographic location, an endpoint context column 912 that lists data relating to the endpoint device context, a Cloud region column 914, a baseline average latency column 916, a recent average latency column 918, a percentage change column 920, a baseline average drop rate column 922, a recent average drop rate column 924, and a percentage change column 926. The aggregated outputs in the table 900 may be used to determine whether the fault is a single user or a systemic issue for example. Other examples of using performance metrics for further analysis include suggestion of alternative combinations of cloud region, end user location, and network characteristics in order to improve performance.

Figure 10:
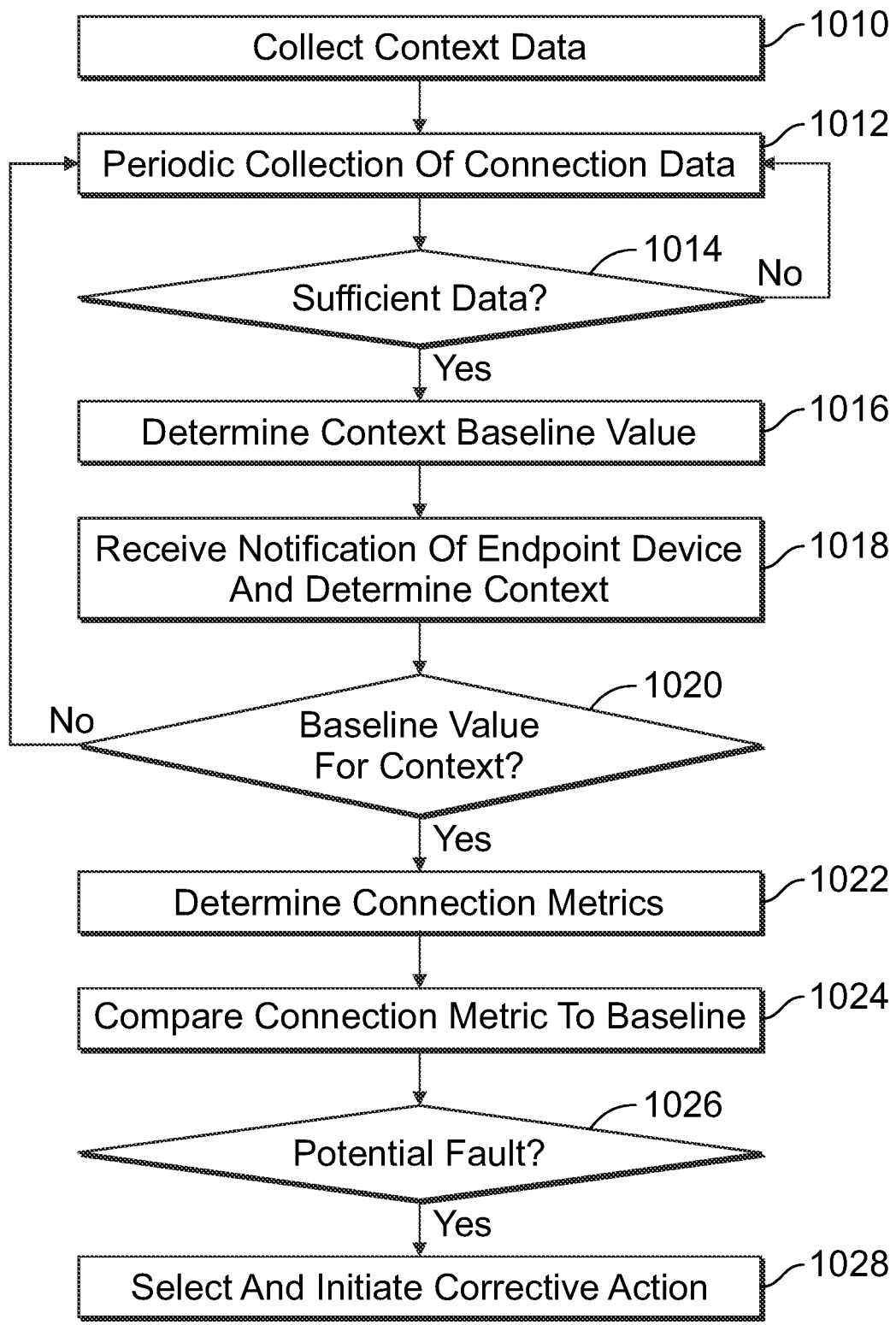
FIG. 10 is a flow diagram of the collection and allocation routine of the example monitoring service.

FIG. 10 is a flow diagram of a routine to collect and analyze context specific data for endpoint devices that access applications supported by a Cloud region. In this example, the machine readable instructions comprise an algorithm for execution by: (a) a processor, (b) a controller, and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowcharts illustrated in FIG. 10, persons of ordinary skill in the art will readily appreciate that many other methods of implementing the example machine readable instructions may alternatively be used. For example, the order of execution of the blocks may be changed, and/or some of the blocks described may be changed, eliminated, or combined.

The routine continuously collects context data for each log on of an endpoint device (1010). The routine then monitors the connection and collects connection data over the session (1012). The routine then determines whether there is sufficient data for aggregation for the context (1014). When there is sufficient data for aggregation for the context, the routine determines baseline values for connection data metrics (1016). If there is insufficient data, the routine continues to collect data from endpoint connection sessions (1012).

The routine then receives notification of an endpoint device accessing the Cloud region and determines the context data of the endpoint device (1018). The routine determines whether a baseline value exists for the context (1020). If no baseline value exists, the routine loops back and collects connection data (1012) to determine a baseline value. If a baseline value exists for the context, the routine then determines a relevant connection metric from an endpoint device session (1022). The routine compares the measured connection metric to the baseline value of the context (1024). The routine determines whether a potential fault exists based on the comparison (1026). If a potential fault is determined, the routine will select and initiate corrective action (1028).

Thus, the above described system and method are directed toward efficiently determining the cause of poor performance of endpoint devices connected to a Cloud based fabric. The system provides more efficient identification of the cause of poor performance by gathering and analyzing data on example indicators such as network latency and packet drops as well as contextual data that can influence the indicators such as location, device, and network characteristics.

The system and method thus provides fine-grained insight into the degradation of baseline performance to recent performance, with ability to analyze the cause for divergence from the baseline to recent behavior. Specific example applications may include a Network Operations Center (NOC) that proactively alerts support personnel only when recent latency or bandwidth is over a threshold of variance from the endpoint context/cloud network performance baseline for that user, before the user complains. False reports of problems are reduced because the context is always to compare with the baseline already experienced by that user from that endpoint. The example system may simplify identifying the root cause of poor performance by pre-correlating relevant information about the change from baseline (such as the list of running applications).

Because the cloud desktop service can orchestrate collection of performance data from the client software and desktop agent, and aggregate the performance data effectively, the example service can enable appropriate actions to be triggered automatically to protect against degradation of user experience. The example service produces timely metrics about user experience changes over time in the most useful context, which is the endpoint context and cloud region. Without this facility, it is difficult to understand the relevance of raw performance information about remote desktop access.

Figure 11:
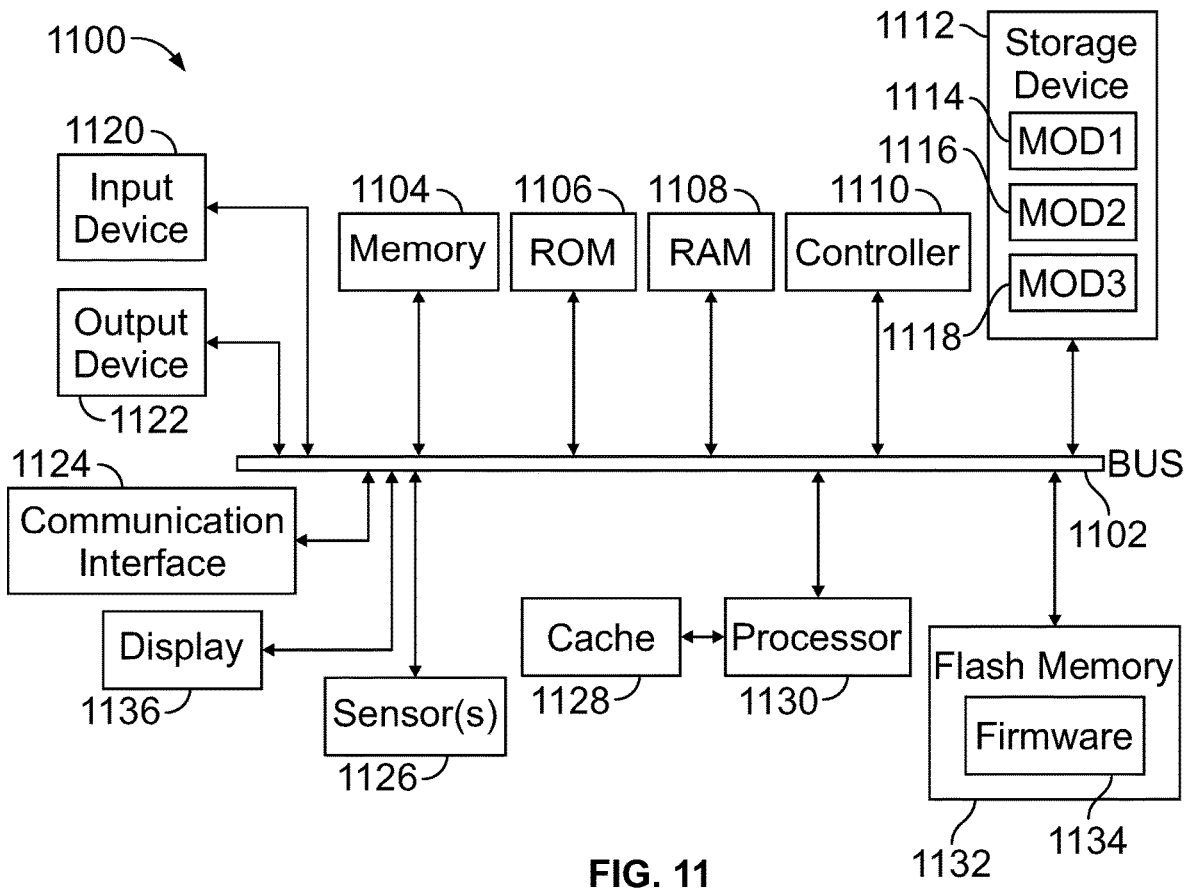
FIGS. 11 and 12 illustrate exemplary systems in accordance with various examples of the present disclosure.
Figure 12:
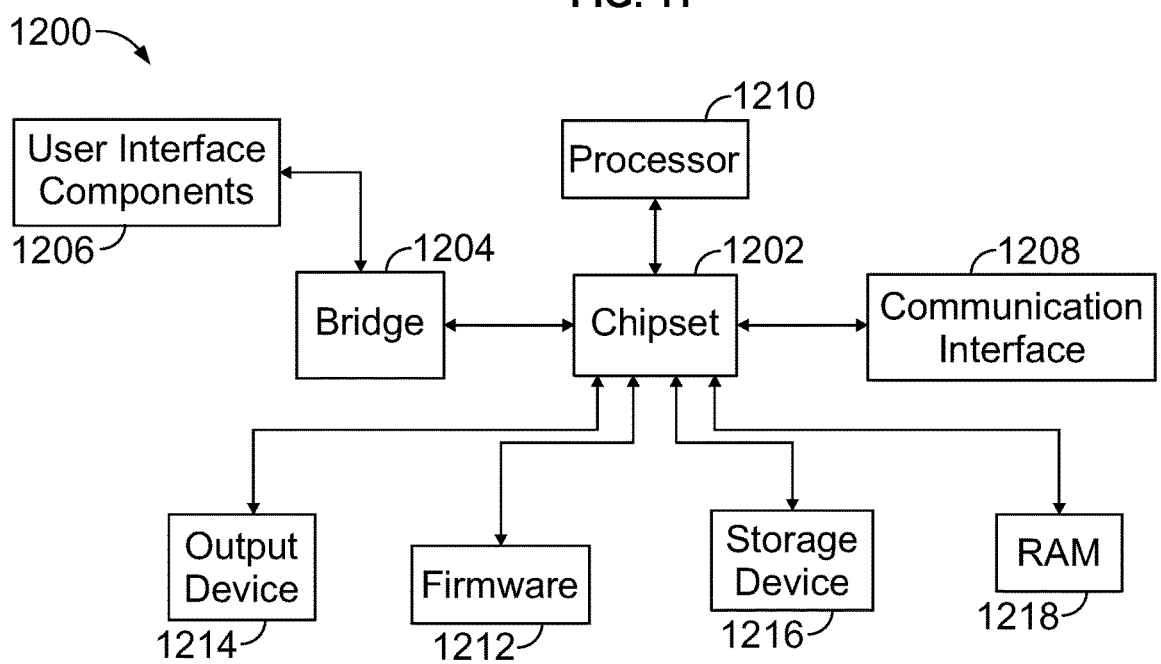

FIGS. 11-12 illustrate an example computing system 1100, in which the components of the computing system are in electrical communication with each other using a bus 1102. The system 1100 includes a processing unit (CPU or processor) 1130 and a system bus 1102 that couple various system components, including the system memory 1104 (e.g., read only memory (ROM) 1106 and random access memory (RAM) 1108), to the processor 1130. The system 1100 can include a cache of high-speed memory connected directly with, in close proximity to, or integrated as part of the processor 1130. The system 1100 can copy data from the memory 1104 and/or the storage device 1112 to the cache 1128 for quick access by the processor 1130. In this way, the cache can provide a performance boost for processor 1130 while waiting for data. These and other modules can control or be configured to control the processor 1130 to perform various actions. Other system memory 1104 may be available for use as well. The memory 1104 can include multiple different types of memory with different performance characteristics. The processor 1130 can include any general purpose processor and a hardware module or software module, such as module 1 1114, module 2 1116, and module 3 1118 embedded in storage device 1112. The hardware module or software module is configured to control the processor 1130, as well as a special-purpose processor where software instructions are incorporated into the actual processor design. The processor 1130 may essentially be a completely self-contained computing system that contains multiple cores or processors, a bus, memory controller, cache, etc. A multi-core processor may be symmetric or asymmetric.

To enable user interaction with the computing device 1100, an input device 1120 is provided as an input mechanism. The input device 1120 can comprise a microphone for speech, a touch-sensitive screen for gesture or graphical input, keyboard, mouse, motion input, and so forth. In some instances, multimodal systems can enable a user to provide multiple types of input to communicate with the system 1100. In this example, an output device 1122 is also provided. The communications interface 1124 can govern and manage the user input and system output.

Storage device 1112 can be a non-volatile memory to store data that is accessible by a computer. The storage device 1112 can be magnetic cassettes, flash memory cards, solid state memory devices, digital versatile disks, cartridges, random access memories (RAMs) 1108, read only memory (ROM) 1106, and hybrids thereof.

The controller 1110 can be a specialized microcontroller or processor on the system 1100, such as a BMC (baseboard management controller). In some cases, the controller 1110 can be part of an Intelligent Platform Management Interface (IPMI). Moreover, in some cases, the controller 1110 can be embedded on a motherboard or main circuit board of the system 1100. The controller 1110 can manage the interface between system management software and platform hardware. The controller 1110 can also communicate with various system devices and components (internal and/or external), such as controllers or peripheral components, as further described below.

The controller 1110 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 2010 to initiate or conduct specific hardware recovery procedures or operations, as further described below.

The controller 1110 can also include a system event log controller and/or storage for managing and maintaining events, alerts, and notifications received by the controller 1110. For example, the controller 1110 or a system event log controller can receive alerts or notifications from one or more devices and components, and maintain the alerts or notifications in a system event log storage component.

Flash memory 1132 can be an electronic non-volatile computer storage medium or chip that can be used by the system 2000 for storage and/or data transfer. The flash memory 2032 can be electrically erased and/or reprogrammed. Flash memory 1132 can include EPROM (erasable programmable read-only memory), EEPROM (electrically erasable programmable read-only memory), ROM, NVRAM, or CMOS (complementary metal-oxide semiconductor), for example. The flash memory 1132 can store the firmware 1134 executed by the system 1100 when the system 1100 is first powered on, along with a set of configurations specified for the firmware 1134. The flash memory 1132 can also store configurations used by the firmware 1134.

The firmware 1134 can include a Basic Input/Output System or equivalents, such as an EFI (Extensible Firmware Interface) or UEFI (Unified Extensible Firmware Interface). The firmware 1134 can be loaded and executed as a sequence program each time the system 1100 is started. The firmware 1134 can recognize, initialize, and test hardware present in the system 2000 based on the set of configurations. The firmware 1134 can perform a self-test, such as a POST (Power-On-Self-Test), on the system 1100. This self-test can test the functionality of various hardware components such as hard disk drives, optical reading devices, cooling devices, memory modules, expansion cards, and the like. The firmware 1134 can address and allocate an area in the memory 1104, ROM 1106, RAM 1108, and/or storage device 1112, to store an operating system (OS). The firmware 1134 can load a boot loader and/or OS, and give control of the system 1100 to the OS.

The firmware 1134 of the system 1100 can include a firmware configuration that defines how the firmware 1134 controls various hardware components in the system 1100. The firmware configuration can determine the order in which the various hardware components in the system 1100 are started. The firmware 1134 can provide an interface, such as an UEFI, that allows a variety of different parameters to be set, which can be different from parameters in a firmware default configuration. For example, a user (e.g., an administrator) can use the firmware 1134 to specify clock and bus speeds, define what peripherals are attached to the system 1100, set monitoring of health (e.g., fan speeds and CPU temperature limits), and/or provide a variety of other parameters that affect overall performance and power usage of the system 1100. While firmware 1134 is illustrated as being stored in the flash memory 1132, one of ordinary skill in the art will readily recognize that the firmware 1134 can be stored in other memory components, such as memory 1104 or ROM 1106.

System 1100 can include one or more sensors 1126. The one or more sensors 1126 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 1126 can communicate with the processor, cache 1128, flash memory 1132, communications interface 1124, memory 1104, ROM 1106, RAM 1108, controller 1110, and storage device 1112, via the bus 1102, for example. The one or more sensors 1126 can also communicate with other components in the system via one or more different means, such as inter-integrated circuit (I2C), general purpose output (GPO), and the like. Different types of sensors (e.g., sensors 1126) on the system 1100 can also report to the controller 1110 on parameters, such as cooling fan speeds, power status, operating system (OS) status, hardware status, and so forth. A display 1136 may be used by the system 1100 to provide graphics related to the applications that are executed by the controller 1110.

FIG. 12 illustrates an example computer system 1200 having a chipset architecture that can be used in executing the described method(s) or operations, and generating and displaying a graphical user interface (GUI). Computer system 1200 can include computer hardware, software, and firmware that can be used to implement the disclosed technology. System 1200 can include a processor 1210, representative of a variety of physically and/or logically distinct resources capable of executing software, firmware, and hardware configured to perform identified computations. Processor 1210 can communicate with a chipset 1202 that can control input to and output from processor 1210. In this example, chipset 1202 outputs information to output device 1214, such as a display, and can read and write information to storage device 1216. The storage device 1216 can include magnetic media, and solid state media, for example. Chipset 1202 can also read data from and write data to RAM 1218. A bridge 1204 for interfacing with a variety of user interface components 1206, can be provided for interfacing with chipset 1202. User interface components 1206 can include a keyboard, a microphone, touch detection, and processing circuitry, and a pointing device, such as a mouse.

Chipset 1202 can also interface with one or more communication interfaces 1208 that can have different physical interfaces. Such communication interfaces can include interfaces for wired and wireless local area networks, for broadband wireless networks, and for personal area networks. Further, the machine can receive inputs from a user via user interface components 1206, and execute appropriate functions, such as browsing functions by interpreting these inputs using processor 1210.

Moreover, chipset 1202 can also communicate with firmware 1212, which can be executed by the computer system 1200 when powering on. The firmware 1212 can recognize, initialize, and test hardware present in the computer system 2100 based on a set of firmware configurations. The firmware 1212 can perform a self-test, such as a POST, on the system 1200. The self-test can test the functionality of the various hardware components 1202-1218. The firmware 1212 can address and allocate an area in the memory 1218 to store an OS. The firmware 1212 can load a boot loader and/or OS, and give control of the system 1200 to the OS. In some cases, the firmware 1212 can communicate with the hardware components 1202-1210 and 1214-1218. Here, the firmware 1212 can communicate with the hardware components 1202-1210 and 1214-1218 through the chipset 1202, and/or through one or more other components. In some cases, the firmware 1212 can communicate directly with the hardware components 1202-1210 and 1214-1218.

It can be appreciated that example systems 1100 (in FIG. 11) and 1200 can have more than one processor (e.g., 1130, 1210), or be part of a group or cluster of computing devices networked together to provide greater processing capability.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware, generalized hardware made specialized by the execution of software thereon that enables the hardware to perform specific function, software stored on a computer-readable medium, or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A Cloud system comprising:
   a Cloud based host server communicating with an endpoint device operated by a user through a network;
   a data collection module coupled to the Cloud based host server and the endpoint device, the data collection module operable to periodically collect connection data associated with the endpoint device over a baseline sample period and collect context data of the endpoint device; and
   an analysis engine operable to:
      determine a baseline value of a connection data metric from the collected connection data collected over the baseline sample period and context data from the end point device;
      compare a connection data metric derived from the connection data to the baseline value of the connection data metric, wherein the baseline value is associated with the context data of the endpoint device; and determine substandard performance based on the comparison; and
      provide an alert when a substandard performance is determined.

2. The system of claim 1, wherein the Cloud based host server provides access to a Cloud desktop to a user of the endpoint device.

3. The system of claim 2, wherein the data collection module is operable to collect a list of applications running on the Cloud desktop or a list of applications running on the endpoint device.

4. The system of claim 1, wherein the user is one of a plurality of users that access the Cloud based host server via a plurality of endpoint devices.

5. The system of claim 4, wherein the data collection module determines the baseline value based on context data collected from endpoint devices of users having a similar context as the user of the endpoint device.

6. The system of claim 1, wherein the connection data is one of packet drop count or network latency time.

7. The system of claim 1, wherein the contextual data includes one of endpoint device location, network connection type, connection hardware, and endpoint device type.

8. The system of claim 1, wherein the analysis engine provides a percentage of a connection data metric relative to an average data metric of the baseline.

9. The system of claim 1 further comprising a desktop service control plane interfacing with a client application on the endpoint device for collecting the context data and an agent on the Cloud based host server for collecting the connection data.

10. The system of claim 9, wherein the desktop service control plane is configured to remove unsanctioned applications, or prioritize selected traffic to the Cloud region in response to determining substandard performance.

11. A method for evaluation of performance of an endpoint device in network communication to a Cloud region, the method comprising:
collecting contextual data from the endpoint device;
collecting periodic connection data over a baseline sample period relating to communication between the endpoint device and the Cloud region;
determining a baseline value of a connection data metric from the collected connection data collected over the baseline sample period and context data from the end point device;
comparing a connection data metric from the collected periodic connection data with the baseline connection data value associated with the context data from endpoint device; and
determining whether performance of the connection is substandard based on the comparison.

12. The method of claim 11, further comprising providing access to a Cloud desktop to a user of the endpoint device by the Cloud region.

13. The method of claim 12, further comprising collecting a list of applications running on the Cloud desktop collecting a list of applications running on the endpoint device.

14. The method of claim 11, wherein a user associated with the endpoint device is one of a plurality of users that access the Cloud region via a plurality of endpoint devices.

15. The method of claim 14, wherein the baseline value is determined based on context data collected from endpoint devices of users having a similar context as the user of the endpoint device.

16. The method of claim 11, wherein the connection data is one of packet drop count or network latency time.

17. The method of claim 11, wherein the contextual data includes one of endpoint device location, network connection type, connection hardware, and endpoint device type.

18. The method of claim 11, further comprising providing a percentage of a connection data metric relative to an average data metric of the baseline.

19. The method of claim 11, further comprising configuring a desktop service control plane to remove unsanctioned applications, or prioritize selected traffic to the Cloud region in response to determining substandard performance.

20. A non-transitory computer-readable medium having machine-readable instructions stored thereon, which when executed by a processor, cause the processor to:
collect contextual data from an endpoint device;
collect periodic connection data over a baseline sample period relating to communication between an endpoint device and a Cloud region;
determine a baseline value of a connection data metric from the collected connection data collected over the baseline sample period and context data from the end point device;
compare a connection data metric from the collected periodic connection data with the baseline connection data value associated with the context data from endpoint device; and
determine whether performance of the connection is substandard based on the comparison.

* * * * *